Dec. 26, 1967     D. D. HUNDT ET AL     3,360,273

INFLATABLE GASKET FOR PIPE JOINTS

Filed Nov. 30, 1965

INVENTORS
DONALD D. HUNDT
DAVID G. GREENLIE,
          DECEASED
BY MARGUERITE G. GREENLIE,
          ADMINISTRATRIX

BY *Petro Kalimon*

ATTORNEY

United States Patent Office 3,360,273
Patented Dec. 26, 1967

3,360,273
INFLATABLE GASKET FOR PIPE JOINTS
Donald D. Hundt, Arlington, Mass., and David G. Greenlie, deceased, late of Weston, Mass., by Marguerite G. Greenlie, administratrix, Wiscasset, Maine, assignors to W. R. Grace & Co., Cambridge, Mass., a corporation of Connecticut
Filed Nov. 30, 1965, Ser. No. 510,708
6 Claims. (Cl. 277—34)

ABSTRACT OF THE DISCLOSURE

A gasket for sealing pipe joints comprised of an inflatable tube having a rib projecting from its periphery and a channel which curves into the rib area. The side wall of the rib has a thickness which is less than the upper and lower rib walls and is adapted to lock the gasket in place. Suitable inflating materials include chemically reactive semi-solid or liquid materials, such as epoxy resins and curing agents therefor.

---

This application is a continuation-in-part of application Ser. No. 204,292 filed on Jan. 21, 1962 and now abandoned.

This invention relates to a gasket. More particularly, it relates to inflatable gaskets suitable for sealing soil pipe joints.

Cast iron soil pipes are used in home plumbing systems as the central carrier to convey the waste from bathrooms, kitchens, and laundry areas to a main sewer line located outside the house. Such pipes are customarily sealed with a calked lead-oakum type joint. The joints, which may be vertical or horizontal, are formed from molten lead and oakum and then calked with irons to provide a tight seal.

In making a vertical calk joint, both the bell and spigot ends of the pipe must be thoroughly dry in order to avoid splitting the cast iron pipe or causing a minor explosion when the molten lead is poured. After drying the parts, oakum (pitch-treated hemp) is packed into the joint and filled to a point about one inch from the top. Molten lead is then poured onto the oakum until the lead rises slightly above the bell rim. Calking irons are then used to drive the lead into the joint to ensure a tight seal against leakage of water, vapors, and other waste material which normally pass through the pipe line. The outside edge of the joint is first calked by moving the iron slowly around the joint, with its taper facing the outside, while hammering it lightly. The taper is then faced to the inside and the iron is then used in an analogous manner around the inner portion of the joint. The hammer blows must not be too severe since this may crack the brittle cast iron pipe. The calking step increases the pressure of the lead which is exerted laterally against the pipe surfaces and this pressure exists permanently in the joint to form a tight seal.

There is but a slight variation in the process involved in making a horizontal calk joint. After the oakum is packed into the joint, an asbestos pouring rope is attached to the pipe prior to the pouring of the molten lead. After the joint is filled, the calking process is the same as that described above for a vertical joint except that the inner section is calked before the outside edge.

From the foregoing description, it will be appreciated that formation of the lead-oakum type seals involves numerous operations and is quite time-consuming. In addition, the amount of pressure which is applied by the calking step in order to form an adequate seal is left to the discretion of the individual operator. As a result, no two seals are identical. Frequently, inadequate seals are formed in that minute leaks through which obnoxious vapors can escape are not immediately apparent and are detectable only after the piping system is put into service. In such cases, it is not uncommon to find that these leaks exist in portions of the pipe joints which are located in difficulty accessible areas, such as inside wall panelling, and, in order to reach and repair the faulty joint, panels must be removed.

It is, therefore, an object of the present invention to provide an improved gasket for sealing pipe joints which overcomes the difficulties inherent in the lead-oakum type joint. This objective is achieved by means of an inflatable gasket which is easily installed and subsequently inflated with a liquid or semi-solid material. When completely inflated, the expanded gasket provides a fully pressurized tightly sealed pipe joint. The rigidity of the joint may be increased by using, as the inflating material, one which solidifies under certain reactive conditions, such as ambient or increased temperature.

The inflatable gasket comprises an annular tube having a circumferential rib projecting from a portion of the outer periphery thereof. The rib is comprised of upper, side and lower walls in which the thickness of the side wall is less than the upper and lower walls taken individually. A confined channel passes through the body of the tube and leads into the rib area and is adapted to receive the material which will inflate the gasket.

In forming a seal, the gasket is stretched over the spigot end of a pipe and the gasketed end is then inserted into the bell end of another pipe leaving annular space therebetween. Any suitable means is then employed to introduce the inflating material into the gasket channel, such as an air-operated two-component gun, a hand-operated one-component gun, and a hypodermic-type needle. As the inflating material flows into the channel, the gasket expands sideways first from the thin side wall section followed by expansion of the remaining sections until the entire annular space is occupied. The varying thickness of the respective rib walls has a distinct advantage in preventing dislodgement of the gasket from the sealing area. When fully inflated, the gasket exerts a uniform pressure throughout the wall surface of the pipe joint, thus ensuring a complete seal.

The invention is further illustrated by the attached drawing in which.

Figure 1:
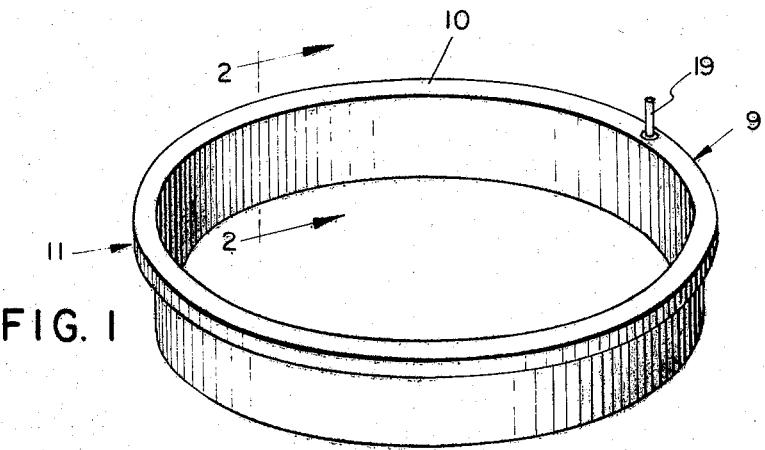
FIG. 1 is a perspective view of an uninflated gasket prior to insertion into a pipe joint and having a rib projecting from the outer periphery of the top portion.
Figures 2, 3, 4:
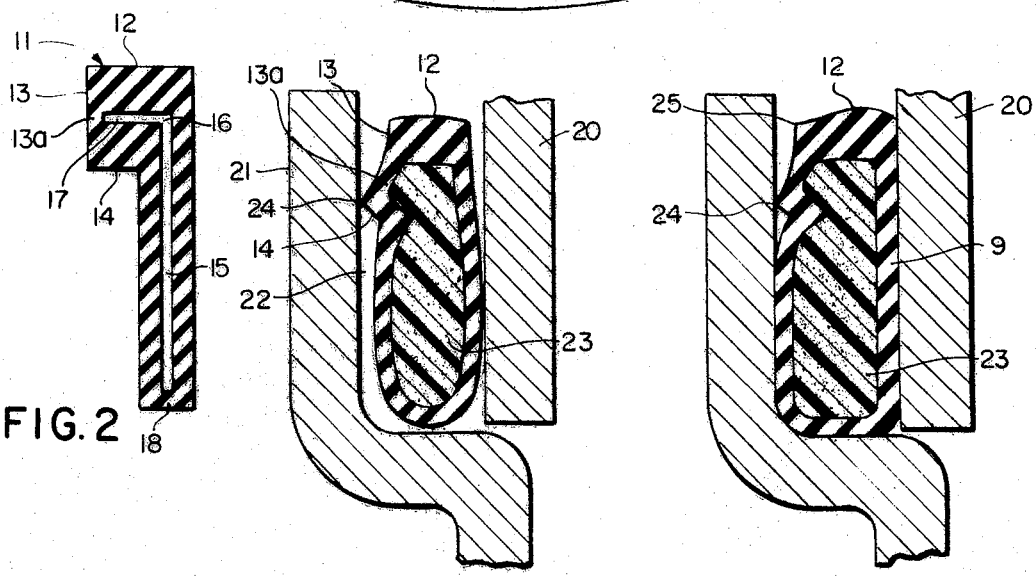
FIG. 2 is a vertical cross-sectional view of the gasket taken on the line 2—2 of FIG. 1.
FIG. 3 is a fragmentary vertical cross-sectional view of a pipe joint with the gasket in place and partially expanded.
FIG. 4 is a view similar to FIG. 3 showing the gasket in an advanced stage of expansion.

Referring to FIGURES 1 and 2, the gasket, shown generally at 9, is comprised of an annular inflatable tube 10 having a circumferential rib segment, shown generally at 11, projecting radially outwardly from the top portion of the outer peripjhery of the tube. The rib segment is comprised in vertical cross-section of an upper horizontal wall 12, a vertical side wall 13 and a lower horizontal wall 14 lying at right angles. The side wall has a thickness at about its midsection 13a which is less than the upper and lower walls taken individually. While FIGURE 2 illustrates upper and lower walls having thicknesses of substantially the same dimensions, the upper wall may have a greater thickness and thus the thin portion of the side wall will lie below its midsection. The thicker upper wall enhances resistance of the gasket from being displaced out of the pipe joint sealing area.

A continuous circumferental channel 15 forms a core within the tube and is adapted to receive material to inflate the gasket. The upper extremity of the channel radiates outwardly at 16 and leads into the rib area at about or below the midsection of said wall 13. The end wall 17 of the channel terminates a short distance from the side wall 13 to provide a thickness at this point which is less than the thickness of either the upper or lower walls. The marginal edge 18 of the lower part of the gasket is sealed by suitable means to confine the channel within the gasket.

The inflating material may be introduced into the tube through nozzle 19 which leads into channel 15. The nozzle, however, is not an essential feature of this invention and other means may be used to accomplish the same result. For example, a needle affixed to the discharge end of a loaded grease gun may be used. It may be of simple construction comprising a cylinder having an axial passageway and tapered to a point at its discharge end. In operation the tube is punctured with the tapered point and the inflating material is passed from the grease gun into the chanel 15 through the passageway of the needle. After the channel area is filled, the needle is withdrawn and the puncture is heat sealed.

Figure 5:
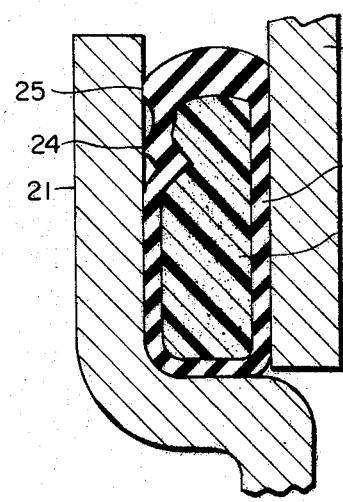
FIG. 5 is a view similar to FIG. 3 in which the gasket is illustrated in its full expanded state.

FIGURES 3, 4 and 5 illustrated a method of sealing pipe joints using the gasket of this invention. The uninflated tube 10 of FIGURE 1 is stretched around the outer periphery of the spigot end 20 of a pipe and the gasketed end is then inserted into the bell end 21 of a second pipe. The gasketed spigot end 20 rests loosely in the bell end, leaving annular free space 22. The amount of reactive material which will be used and the extent to which the tube will expnad is determined by the volume of free space surrounding the respective pipe ends.

After both pipes have been assembled, the gasket is inflated by introducing the inflating material 23 (shown as a plastic material) through nozzle 19. As the material is continuously passed into the channel 15, the gasket expands correspondingly until the free space 22 is completely occupied. The sides of the gasket expand oppositely sideways and comes in frictional contact with the respective walls of the pipes. The ribs 11 engages the inner wall of bell end 21 and holds the gasket in permanent sealing position.

The principle upon which the gasket of this invention operates is dependent upon the varying wall thicknesses of the rib segment 11. This may be illustrated by reference to the cross-sectional views of FIGURES 3, 4, and 5. As the gasket is initially inflated, the inflating material 23 exerts the same pressure in all directions, and the resulting pressure forces the lower section of the tube outwardly toward the inner surface of the bell end 21 of the pipe. The wall in the rib area that will expand first, however, is dependent upon the relative resistance of the different wall sections to deformation. For example, upper wall 12 and lower wall 14 have greater resistance due to their greater thicknesses than section 13a so that expansion will first occur at section 13a. Continued addition of inflating material increases the pressure within the tube causing section 13a to yield and move diagonally toward the surface of the pipe. At this stage section 13a performs the function of a hinge. As additional inflating material is passed into the channel, the pressure on section 13a is temporarily relieved and is shifted to move lower wall 14 downwardly and outwardly, forcing corner 24 (where the side and lower walls merge) to wedge against the pipe surface to lock the gasket in place.

As more inflating material is forced into the channel, the lower portion of the tube frictionally contacts the pipe surface as illustrated in FIGURE 4. It is noted that at this point that the upper wall 12 has developed a slight curvature. Continued addition of the inflating material forces the upper wall 12 to yield by moving laterally in the direction of the pipe surface. When the gasket is fully inflated, corner 25 (where the side wall and the upper wall merge) is forced into contact with the pipe surface causing the exterior surface of the wall 12 to assume a convex shape as shown in FIG. 5. The corners 24 and 25 respond to the pressure which is exerted within the channel and lock the gasket in the sealing area.

The sealing effectiveness of the gasket is directly related to the pressure which the inflating material exerts against the gasket after it has been inflated to contact the walls of spigot end 20 and bell end 21 and to completely occupy annular space 22. The higher the inflating pressure, the greater is the sealing pressure which is urged against the pipe walls. The greatest pressure is exerted at corner 24. Thus, the varying wall thicknesses of the rib are not only important in creating the mechanical advantage of preventing expulsion of the gasket out of the pipe joint during inflation, but they also increase the contact pressure between the gasket and the pipe walls above the internal pressure of the gasket.

The gasket tubing may be fabricated of any resilient and stretchable material, such as polyurethane elastomers, neoprene rubber, linear polyethylenes, ethylene-propylene rubbers, cross-linked polyethylene-rubber blends and plasticized vinyl resins, such as polymers of vinyl chloride. Specific materials include 4,4′ methylene-bis-2-chloroaniline-cured polyurethane elastomer (Adiprene L); a composition comprising 100 parts of high density polyethylene having a melt index between 1 and 10, 0.5 part stearic acid, 2.0 parts zinc oxide, 5.0 parts titanium dioxide pigment, and 2.0 parts dicumyl peroxide; polyethylene polymerized at 500 pounds per square inch pressure and 135 to 190° C. in the presence of heat-activated chromium oxide catalyst supported on a silica-alumina base then cured by irradiation (Marlex); and a polymer prepared at 60 to 250° C. and 1 to 2000 atmospheres pressure in the presence of a triethyl aluminum catalyst containing a titanium tetrachloride activator and then irradiated (Super Dylan). To insure a seal on a pipe wall having an irregular surface, a multiplicity of minute perforations can be made in the tubing to allow a small amount of the inflating material to ooze out of the circumferential channel and wet the surface between the gasket and the pipe.

The materials used to expand these gaskets are preferably reactive liquids or semi-solids which are curable at ambient or elevated temperatures to infusible solids. The choice of material is limited only by a consideration of the decomposition temperature of the gasket tubing. Especially suitable compositions are epoxy resins formed by the reaction of an epihalohydrin and a dihydric phenol, such as epichlorohydrin and bisphenol-A. The properties of such resins may be modified by admixture with fillers of generally spherical shape and low oil absorption, e.g., titanium dioxide, aluminum oxide, barium sulfate and silica. Other suitable compositions are unsaturated polyesters such as one containing 75 percent of the reaction product of maleic anhydride and dipropylene glycol mixed with 25 percent styrene monomer or a 75–25 combination of the reaction product of fumaric acid and propylene glycol with styrene monomer. These polyesters are cured with suitable peroxy compounds.

Particularly useful inflating compositions are illustrated in the following Examples I to IV.

*Example I*

This composition was composed of 1 part of silica filler and 1 part of a reactive compound. The reactive compound was made up of part A containing 2500 grams of the condensation product of a polymerized unsaturated fatty acid with an aliphatic amine, the resulting product having an amine value of 210–230 (Versamid 125), and 270 grams of diethylenetriamine. Part B of this compound contained 2700 grams of an epoxy compound having an epoxide equivalent of 190–210 (Epon 828); 375 grams of nonyl phenol; and 675 grams of asbestine filler. Part A and Part B were mixed together and then combined with the silica filler.

*Example II*

This composition comprised 1 part reactive compound admixed with 0.5 part filler. Part A of the reactive compound was composed of 100 parts of an unmodified liquid epoxy compound mixed with 50 parts tabular alumina. Part B contained 50 parts of a liquid rubber (Thiokol LP-30) and 10 parts tri-dimethylaminomethyl phenol. Part A and Part B were combined and subsequently admixed with aluminum oxide filler.

*Example III*

One part of reactive compound was admixed with 2 parts filler. Part A of the reactive compound was composed of 50 parts each of two pure epichlorohydrin-bisphenol A resins, one having an epoxide equivalent of 180–200 (Epi-Rez 510) the other having a lower epoxide equivalent (Epi-Rez 504), 20 parts aluminum stearate, 80 parts titanium dioxide, and 65 parts calcium carbonate. Part B was made up of 150 parts of a viscous flexibilizer hardener (Epi-cure 85), 20 parts aluminum stearate, and 225 parts calcium carbonate. Parts A and B were mechanically mixed and incorporated with additional titanium dioxide filler.

*Example IV*

A reactive material was prepared by mixing 1 part of a reactive compound with 5 parts filler. Part A of the reactive compound was a mixture of epoxy resins and contained 75 parts of a material having an epoxide equivalent of 225–290 (Epon 834) and 25 parts of a material having an epoxide equivalent of 140–165 (Epon 562). Part B consisted of 10 parts tri-dimethylaminomethyl phenol. Parts A and B were combined and barium sulfate filler was added.

As used in the examples, epoxide equivalent is defined as the weight of resin in grams which contains 1 gram chemical equivalent of epoxy.

An alternative gasket of this invention is one in which one-half of a two-component inflating composition is contained in the tubing. This half may be infused into a portion of the circumferential channel of the gasket tubing at the time of its manufacture as a coating for the channel walls. This component will not react until the second half is introduced after the gasket is inserted in the pipe joint. Typical two-component compositions are those illustrated in the examples as Parts A and B.

What is claimed is:

1. A gasket for bell and spigot pipe joints which comprises an annular inflatable tube, a preformed circumferential rib segment projecting radially outwardly from a portion of the outer periphery of said tube, said rib segment comprising in vertical cross-section an upper wall, a side wall and a lower wall, the thickness of the side wall being less than the upper and lower walls taken individually, and a confined continuous circumferential channel forming a core within said tube, the upper extremity of said channel being directed radially outwardly to lead into the rib segment, the end wall of the upper extremity of said channel terminating a short distance from the side wall of said rib segment whereby the rib segment is forced to engage the inner surface of the bell end of a pipe and hold the gasket in place as the channel is filled with inflating material.

2. A gasket according to claim 1 which is provided with means for introducing inflating materials into said channel.

3. A gasket according to claim 1 wherein the tube is comprised of an elastomeric material.

4. A gasket according to claim 1 wherein the tube walls are provided with a multiplicity of minute perforations which lead into the channel.

5. A gasket according to claim 1 wherein a portion of the channel is coated with a reactive material.

6. A gasket according to claim 5 wherein the reactive material is a liquid material which is curable to an infusible solid.

References Cited

UNITED STATES PATENTS

| 2,815,966 | 12/1957 | House | 277—34.3 X |
| 2,894,635 | 7/1959 | Irthum et al. | 277—34.3 X |
| 3,222,076 | 12/1965 | Hollingsworth | 277—34.3 |

FOREIGN PATENTS

| 494,402 | 10/1938 | Great Britain. |
| 730,310 | 5/1955 | Great Britain. |

SAMUEL ROTHBERG, *Primary Examiner.*